Sept. 21, 1971  F. WIENEKE ET AL  3,606,742
ARRANGEMENT FOR THE AUTOMATIC CONTROL OF THE
THRESHING PROCESS ON COMBINE HARVESTERS
Filed March 26, 1970  2 Sheets-Sheet 1

INVENTORS
FRANZ WIENEKE
MANFRED EIMER

BY
ATTORNEYS

United States Patent Office

3,606,742
Patented Sept. 21, 1971

3,606,742
ARRANGEMENT FOR THE AUTOMATIC CONTROL OF THE THRESHING PROCESS ON COMBINE HARVESTERS
Franz Wieneke, 14 August-Lange-Strasse, Bovenden, Germany, and Manfred Eimer, 11 Finkenweg, Gottingen-Grone, Germany
Filed Mar. 26, 1970, Ser. No. 22,954
Claims priority, application Germany, Apr. 5, 1969,
P 19 17 670.6
Int. Cl. A01d *41/02*
U.S. Cl. 56—10.2
31 Claims

ABSTRACT OF THE DISCLOSURE

An arrangement for the automatic control of the threshing process on combine harvesters of which the well known working tools include a control circuit for the automatic regulation of the threshing-cylinder speed, in which a reduction delayer is incorporated which is so constructed that an output value from a throughput measuring sensor connected in this first control circuit or a value derived from said output value which is released by a decrease in the crop throughput is only allowed to pass this reduction delayer after the expiry of a period of time which is substantially the same as that required for the conveyance of the crop from the moment when it is detected by the throughput measuring sensor to the time when that quantity of the crop which is determined by the last existing speed of the threshing cylinder has been threshed out in the threshing organs, whereas an output value or a value derived therefrom which is released by an increase in the crop throughput can pass this reduction delayer unhindered.

BACKGROUND OF THE INVENTION

Figure 1:
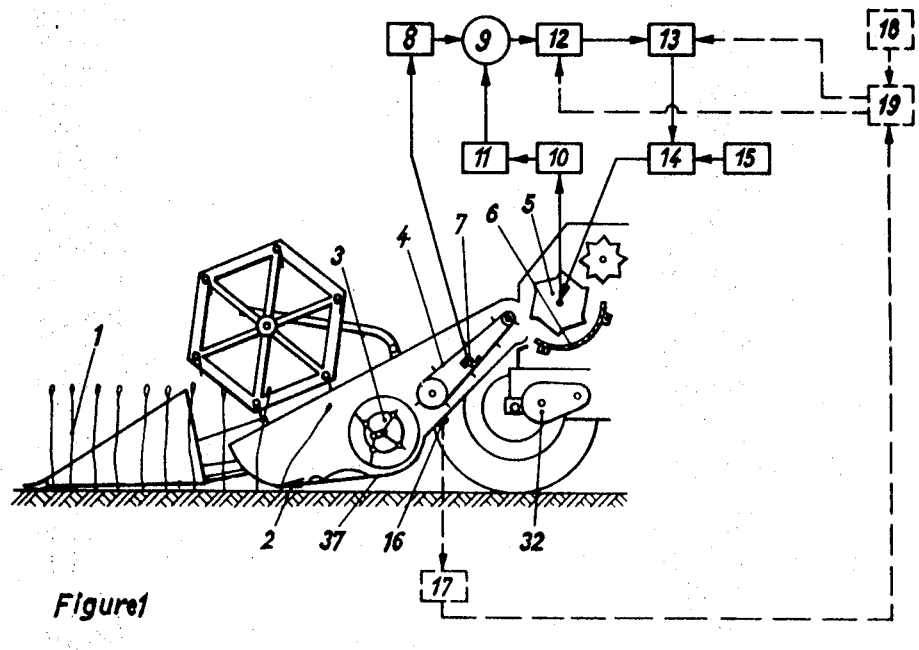

This invention relates to combine harvesters, and more specifically to an arrangement for the automatic control of the threshing process on a combine harvester. As regards the combine itself, it is assumed that besides the cutting organs, threshing organs, which as a rule comprise a concave and a threshing cylinder, it is equipped with conveying organs which are positioned between the cutting organs and the threshing organs. Furthermore, it is assumed that the conveying organs comprise at least one organ, e.g. a sloping elevator or an intake and conveyor auger, which is so arranged that it, in whole or in part, undergoes a deflection or a measurable mechanical stress, which is mainly determined by the volume of the crop throughput which prevails at this place on the conveying organs.

Arrangements for the automatic regulation of the threshing procedure on combines have already become known in the art. In one such arrangement, two control circuits are stipulated, one of which automatically regulates the ground speed and the other the threshing-cylinder speed and, indeed, as dependent upon the crop throughput in both cases.

The arrangements which were first known were those in which only the ground speed of the combine was regulated in accordance with the crop throughput. It is true that such arrangements reduce the ground speed of the combine as soon as an increased crop throughput is detected and that this reduction in ground speed will have the result that, after a certain period of time, a lower crop volume, determined by the slower ground speed, is fed to the threshing organs. This, however, cannot prevent the crop which has already been grasped by the conveying organs from being threshed by the threshing organs. Under difficult harvesting conditions this will lead to increased threshing losses, if not to an actual blockage of the working components, or to the breakage of machine parts. To provide a remedy for this, a second control circuit was included which had the task, in the event of a variation in the crop throughput, to alter the speed of the threshing cylinder accordingly. However, even with the provision of this second control circuit, a satisfactory quality of performance by the combine could not in all cases be achieved.

If the crop is picked up in heaps by the combine, during transport to the threshing organs the first reaction of that part of the conveyor organs to which the throughput-measuring sensor is fitted will lead to an increase in the speed of the threshing cylinder. If the crop throughput should now considerably decrease, or even cease entirely, with such an arrangement the speed of the threshing cylinder will again be reduced before the crop has passed the threshing organs, or even reached them, if the conditions are unfavourable, so that the crop will be dealt with, in part or completely, at a reduced speed which leads to increased threshing losses if not to a complete blockage of the threshing organs. Furthermore, with already-published arrangements for regulating the speed of the threshing cylinder, no attention has been paid to the fact that, in the case of a sudden increase or decrease of the crop throughput, one can only count on an insignificant alteration in the time required for conveyance in the case of a small alteration in throughput, the threshing-cylinder speed variation must be fairly exact within an equally great time interval but this will be different if an increase or decrease of speed is required. In addition, with the arrangements published hitherto, no consideration has been given to the type of crop and its moisture content which affect its transport characteristics and thus lead to different times required for its conveyance.

Furthermore, for the best possible organization of the threshing procedure with respect to the crop throughput and the losses arising during threshing, besides matching the speed of the threshing cylinder to the crop throughput, consideration must also be given to the type of crop, its moisture content and the threshing gap, since these largely determine the functional connection between throughput and threshing-cylinder speed. Crops which are difficult to thresh require higher threshing-cylinder speeds and/or a narrower concave gap. On the other hand, grain which is easily broken must only be threshed at a low threshing-cylinder speed. A high moisture content in a crop necessitates sharper treatment by the threshing organs, i.e. higher threshing-cylinder speeds and/or a narrower threshing gap, since wet corn can only be released with difficulty from its husk and in this condition it is also less liable to fracture.

SUMMARY OF THE INVENTION

It is the object of the present invention to overcome these serious disadvantages and to provide in the conventional control circuit which serves to regulate the threshing-cylinder speed, a control circuit element or reduction delayer which is of such design that it permits the undisturbed passage of regulating signals which lead to an increase in the speed of the threshing cylinder but allows signals which effect a reduction in the threshing-cylinder speed only to pass after the lapse of a certain period of time which is exactly the same as that required for the transport of the crop from the moment when its presence is detected by a sensor, to the time when that quantity of the crop which has determined the last set speed of the threshing cylinder has been threshed out in the threshing organs.

To attain this object the present invention provides an arrangement for the automatic control of the threshing process on combine harvesters equipped with cutting organs, threshing organs which, as a rule, substantially consist of a threshing cylinder and a concave, a drive for the threshing cylinder, conveying organs arranged between the cutting organs and the threshing organs and comprising an intake and conveyor auger and a sloping elevator with a scraper chain, a first control circuit for automatically regulating the speed of the threshing cylinder in dependency on the crop throughput, measured in the area of the cutting or conveying organs, in such a manner that in the event of an increase in the crop thoughput a rise in the threshing-cylinder speed and in the event of a decrease in the crop throughput a reduction in the threshing-cylinder speed will occur, and if necessary a second control circuit for regulating the combine ground speed in dependency on the crop throughput in such a manner that the combine ground speed is altered inversely to the change in the crop throughput, wherein in the first control circuit a reduction delayer is incorporated which is so constructed that an output value from a throughout measuring sensor connected in this first control circuit or a value derived from said output value which is released by a decrease in the crop throughput is only allowed to pass this reduction delayer after the expiry of a period of time which is substantially the same as that required for the conveyance of the crop from the moment when it is detected by the throughput measuring sensor to the time when that quantity of the crop which is determined by the last existing speed of the threshing cylinder has been threshed out in the threshing organs, whereas an output value or a value derived therefrom which is released by an increase in the crop throughput can pass this reduction delayer unhindered.

Such an arrangement provides a guarantee that, with a high crop throughput, the threshing cylinder will continue to operate for the time required to complete its processing and only after the expiry of this period the speed will be reduced to that required by the following and smaller crop throughput to be subsequently threshed in the threshing organs. Such a reduction in the threshing-cylinder speed is also indispensible for optimum threshing since otherwise damage to the grain will be considerable.

An alteration in the threshing-cylinder speed to conform to the throughput can be accomplished by various means:

By the use of non-linear elements through which the signal has to pass en route from the comparator of the control circuit to the regulating unit, or by the adoption of auxiliary power for regulating purposes through suitable control of the auxiliary power flow, it can be arranged that the threshing-cylinder speed becomes strongly progressive with an increasing alteration in the throughput. With the help of a time element with an adjustable time constant, the regulating signal can be so retarded that the threshing cylinder reaches the speed required to process the crop conveyed to the threshing organs under optimum threshing conditions.

The differing conveying characteristics of the various types of crop and the moisture content present can be determinated from adjustments which should be made to the command instrument in the control circuit and from the use of a suitable moisture meter, the sensor of which should preferably be positioned in the channel of the sloping elevator. On the basis of this information an adjustment should be made either to the rating of an element already present or to be included in the control circuit through which the regulating signal must pass en route from the comparator to the regulating unit and/or the auxiliary power flow to the regulating unit. In the case of the control equipment having a delaying element with an adjustable time constant which passes the regulating signal, an alteration to the threshing-cylinder speed, taking into account the nature of the crop and its moisture content, can be effected by adjusting this time constant.

In accordance with the invention, the specific properties of the crop which depend upon its nature, together with the measured moisture content, which are set on the command instrument, are also required to fix the speed range of the threshing cylinder and to obtain the optimum matching of the threshing-cylinder speed to the crop throughput with regard to low threshing losses, whereby use can also be made of the opportunity either to record the width of the threshing gap with a suitable measuring instrument and to take this also into account, or to regulate the threshing gap width by means of a further control circuit so that it conforms to requirements.

DESCRIPTION OF THE PREFERRED EMBODIMENTS

An automatic control equipment for regulating the speed of the threshing cylinder in accordance with the invention will now be described by way of example and with reference to the three figures of the accompanying drawings:

With reference now to FIG. 1 of the drawings, differences in a crop 1 about to be harvested by means of a combine harvester lead to a situation where, at a constant combine ground speed, a greater or lesser quantity of the crop is grasped by the cutting organ 2, cut and passed to an intake and conveyor auger 3. To enable the threshing organs consisting of a threshing cylinder 5 and a concave 6 to be adjusted in good time to variations in the crop throughput, it is of advantage to provide a measured-value transmitter between the cutting organ 2 and the threshing cylinder 5, for example on the auger 3 or on a sloping elevator 4 having a scraper chain. In the embodiments shown in the drawings the deflection of the scraper chain of the elevator 4 is used for measuring the crop throughput with the aid of a throughput measuring sensor 7, on the chain, the signals of which are intensified with the aid of an amplifier 8, which can, if necessary, include a transformer, and passed on to a first comparator 9. In the comparator 9, the signals of the measured crop throughput are compared with the signal of the threshing-cylinder speed, measured with the aid of a sped sensor 10, and amplified by means of measured-value amplifier and transformer 11. The difference signal is passed on to a control circuit element 12. This control circuit element 12 is so constructed that it permits all signals which result in an increase in the threshing-cylinder speed to pass undisturbed, but only allows the passage of signals which result in lower threshing-cylinder speeds after a certain period of time which corresponds to the period of time required for the transport of the cop from the moment when it is detected by the throughput measuring sensor 7, to the moment when it is threshed out by the threshing organs. The control-circuit element 12, because of its manner of functioning, will hereafter be termed a "reduction delayer."

The described operation of the reduction delayer 12 can, for example, be obtained in the case of a pneumatic or hydraulic system by the parallel connection of a check valve and a throttle which, together, may be termed a throttle check valve or a fluid flow limit valve. The check valve is so connected that it does not impede the oil flow necessary for the setting of higher threshing-cylinder speeds apart from flow losses. If the speed of rotation is to be reduced, the oil flows in the opposite direction, the check valve closes and the oil must flow through the choke aperture in the parallel connected throttle. In the time unit, only a lesser quantity of oil can then pass through the throttle so that the threshing-cylinder speed is only gradually reduced. Instead of a throttle, also known storage reservoirs can be used for achieving the time lag.

In the case when electrical means are used the reduction delay can be effected with more precision. It will then be necessary to differentiate the input signal of the reduction delayer 12 for control purposes. If an increase in the crop throughput is measured, the differentiated signal is positive but should the crop throughput decrease then the differentiated signal is negative. With the aid of the differentiaton of the control signal a step switch having a time element is so controlled that, in the case of a positive control signal, the input signal can pass through the reduction delayer 12 unimpeded but if the control signal becomes negative the step switch has to be passed through so that the onward transmission of the input signal is temporarily interrupted. Simultaneously with the passing through of the step switch, the time element comes into action with its time constant matched to the period of time which extends from the moment when the crop is detected by the throughput measuring sensor 7, to the time when it is threshed by the threshing organs. During this period of time, a regulating unit 14 which is preceded by the reduction delayer 12 receives no signal so that the threshing-cylinder speed remains constant. After the expiry of the time constant of the time element the step switch will be set by this into its neutral position with the result that the input signal can pass through the reduction delayer 12. If during the course of the time constant larger crop throughputs than those which correspond to the threshing-cylinder speed are detected, the step switch will immediately be returned to its former position by the positive control signal so that the input signal can pass through the reduction delayer 12 and effect the necessary increase in speed.

In the case of an electrical and digital crop throughput and threshing-cylinder speed measuring device, the differentiation of the input signal at the reduction delayer for control purposes becomes superfluous, since the necessary control commands for the step switch and its time element can be given directly by a combination of the two digital measurement signals.

A simple possibility of achieving a delayed reduction in the threshing-cylinder speed is offered by a three-point regulating device. With such a device the signal which effects a reduction in the threshing-cylinder speed can be retarded by conventional equipment to the necessary time constant and this can easily be done by a regulating unit which requires two separate signal conductors.

The output signal of the reduction delayer 12 can, if necessary, be further intensified by an amplifier 13 and passed on to a regulating unit 14, such as, for example, a V-belt variator, a variable speed control in the case of a fluid drive motor or separate internal combustion engine, or suitable switchgear for an electric drive, which produces an alteration in the transmission ratio between the threshing-cylinder drive 15 and the threshing cylinder 5 in such a manner that the measurement of an increase in the crop throughput results in an increase in the threshing-cylinder speed and, conversely, a reduction in throughput to a reduction in speed.

If the regulating unit 14 is satisfactorily designed, regulating times can be achieved which are less than the time required for the conveyance of the crop from the moment when it is detected by the throughput measuring sensor 7, to the time when the crop reaches the threshing organs. These great speeds of regulation can be obtained by the adoption of a V-belt variator for altering the transmission ratio between the threshing-cylinder drive 15 and the threshing cylinder 5 with only small regulating forces, if the axially adjustable variator sheaves can be simultaneously moved counter to one another by any known mechanical or hydraulic method. Another very satisfactory type of regulating unit 14 in this kind of application can be provided by a fluid drive motor.

In the case of high adjustment speeds of the regulating unit 14 it is of advantage to provide a time lag between the comparator 9 and the regulating unit 14. This can be achieved by means of a time constant in the reduction delayer 12, by the delaying action of another control circuit element which is already provided between the comparator 9 and the regulating unit 14, or by a delaying element which is to be connected between the comparator 9 and the regulating unit 14.

Regulation of the threshing cylinder in accordance with the crop throughput, with approximately constant regulating times, can be accomplished with the assistance of a markedly progressive characteristic curve of the amplifier 13 for the regulating unit 14 (FIG. 1) if it is not desired to connect a suitable non-linear element between the reduction delayer 12 and the amplifier 13. The same effect will be obtained if, with an increasing output signal from the comparator 9, the auxiliary power flow to the regulating unit 14 is increased so that a greater adjustment path can be realized within the time unit. The adjustment of the auxiliary flow of power to the regulating unit 14 can in the case of hydraulic and pneumatic systems be effected by a controllable pressure or volume limiter, in the case of a mechanical system by the alteration of the transmission ratio of the levers, in the case of a simple electrical system by controlling the voltage, and in the case of alternating current systems by adjustment of the frequency by conventional methods. Different regulating speeds can also be obtained by using a delay element having a controllable time constant. In any case, the time constant of the delay element which is to be provided and through which the control signal must pass on its way from the comparator 9 to the regulating unit 14 must be controlled by the value of the output signal from the comparator 9.

The nature of the crop and its moisture content largely determine its mechanical properties and consequently its conveying characteristics. Depending upon the type of crop, the combine driver pre-selects a basic setting on a command instrument 18. The moisture content of the crop collected by the combine is continually measured by a moisture sensor 16 and the resulting signal is intensified by means of an amplifier 17 and if necessary is also transformed. Both values are combined in a summation element 19 in such a way that they can alter the setting of the time constant of the time element in the reduction delayer 12 and in the above-described delay element in such a manner that when the conveying characteristics of the crop are favourable the time constant will be reduced whilst, conversely, it will be increased when the conveying characteristics are unfavourable. The different conveying characteristics of the crop can also be satisfactorily conformed to if, besides the adjustment of the time constant of the time element in the reduction delayer 12, the auxiliary power flow is increased or decreasesd by the methods shown above, or the controllable non linearity of the amplifier 13 is matched as required to the altered conditions.

Figure 2:
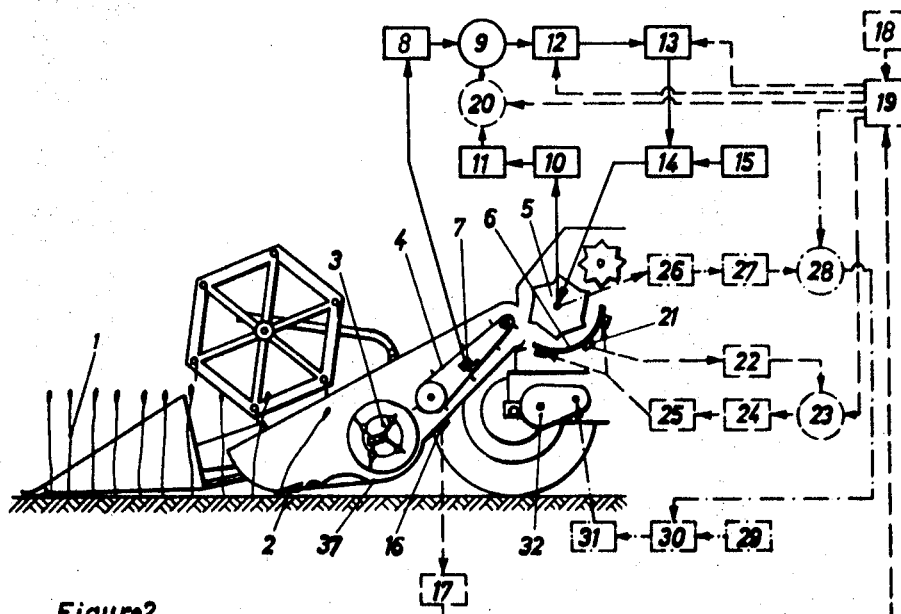

In order to promote optimum threshing conditions, besides the regulation of the threshing-cylinder speed in accordance with the crop throughput as dependent upon its nature and its moisture content, the threshing gap (the mean distance between the threshing cylinder 5 and the concave 6) must also be taken into account. The type of crop, depending upon the throughput, requires that a specific speed range of the threshing cylinder must be maintained, an increase in the crop moisture content necessitating increased threshing-cylinder speeds. A signal which takes both these values into account in a suitable form can be obtained from the summation element 19 and this, as is shown in FIG. 2, can with the help of an addition element 20 be combined with the signal from the threshing-cylinder speed measuring equipment composed of the speed sensor 10 and the measured-value transformer 11. This signal is fed to the comparator 9, in which it is compared with the signal from the throughput measuring equipment comprising the throughput measuring sensor 7 and the amplifier 8. One type of design which conforms to this arrangement would be for the addition element 20 to be connected between the amplifier 8 and the comparator 9. In this case, the influence values of the type of crop and the crop moisture content must be set up in a different manner in the summation element 19; the resulting signal, combined with the signal from the throughput measuring equipment, is fed to the comparator.

To achieve minimum crop losses under difficult harvesting conditions it is of advantage to provide besides the control equipment described an additional control circuit for regulating the concave gap. This additional control circuit comprises a distance feeler 21 for measuring the spacing between the threshing cylinder 5 and the concave 6, an amplifier 22 which possibly also converts the measured signal, a second comparator 23, another amplifier 24, and a concave adjusting device 25. A combined signal from the summation element 19, representing the nature of the crop and its moisture content, serves as a guidance signal for this additional control circuit. A basis setting on the command instrument 18, which is dependent upon the type of crop, ensures that the maximum threshing gap will not be exceeded, whereas an increase in the crop moisture content results in a narrowing of the threshing gap.

It is expedient for the control equipment described to be supplemented by a ground speed regulating equipment of the conventional type. The crop throughput is measured with the aid of a torque sensor 26 which is mounted on the threshing-cylinder shaft. The measured signal from the torque sensor 26 is intensified by means of an amplifier 27, and, if necessary, the measured signal can also be transformed. The signal is compared with the output signal from the summation element 19 in a third comparator 28, this latter signal being determined from the measured crop moisture content and the basic setting on the command instrument 18 which is in accordance with the type of crop. The difference signal effects through a suitable regulating unit 30, which, if necessary, may be preceded by an amplifier, an alteration in the transmission ratio between a drive motor 29 and a gearbox 32 having a clutch 31, so that an increasing torque on the threshing-cylinder shaft leads to a reduction in the ground speed of the combine and a lower torque to a higher ground speed. With the help of this additional ground speed regulating equipment, it is possible to maintain an average throughput level which conforms to the harvesting conditions.

Figure 3:
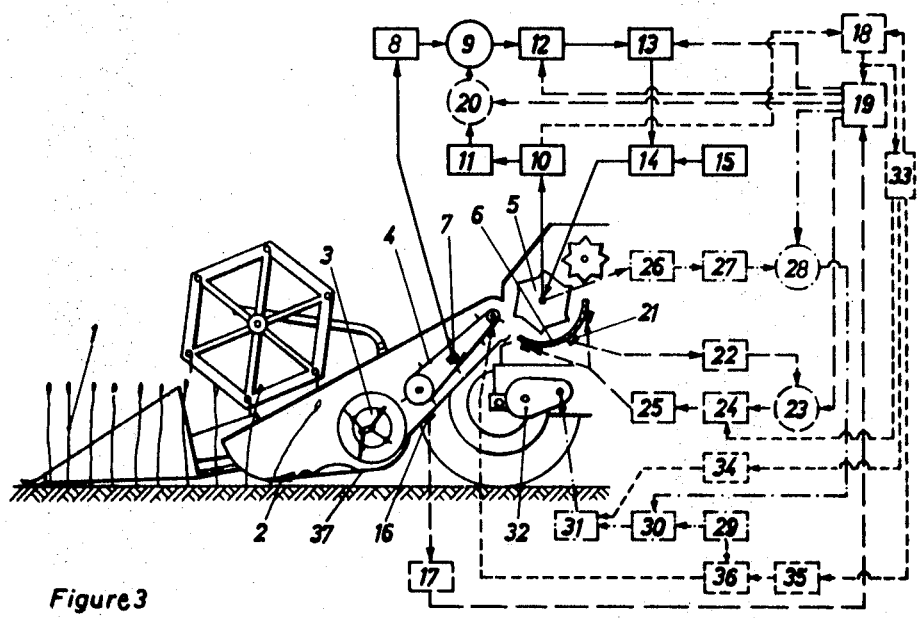

For ease of maneuver on the headlands, which operation is carried out with the combine table raised, it is of advantage to the combine driver if the raising of the combine table 37 operates a change-over switch which cuts out the ground speed regulating equipment and in its place cuts in a pre-selected ground speed setting. When the table 37 is lowered the ground speed regulating equipment will again be brought into circuit. In the case of the combine being driven in a ground-speed range which has been set too low so that the capacity of the combine is not fully utilized, this will be indicated to the combine driver by suitable visual or audible signals from the command instrument 18, which will require him to alter the ground-speed range. FIG. 3 shows the threshing-cylinder speed which has been measured with the speed sensor 10, being transmitted to the command instrument 18. If the threshing-cylinder speed transmitted differs only a little from the lowest speed which, depending on the type of crop to be harvested, is determined by the basic setting on the command instrument 18, the signals just mentioned will be given after a time lag. The values measured by the throughput measuring sensor 7 and by the torque sensor 26 can also be called on to release these signals. When the combine table 37 is raised, this signalling equipment is automatically switched off since for transport duties, emptying the grain tank, and maneuver on the headlands, which operations, as a rule, are carried out with the table raised, the operating organs of the combine are idling so that the signals which are required to change the speed range would distract the combine driver in the performance of his tasks.

When the combine is subjected to particularly severe stresses such as could arise, for example, if foreign bodies are picked up, the organs of the combine can be safeguarded against blockages and breakage by the sensing and regulating units of the control equipment.

These stresses can be determined with the aid of the throughput measuring sensor 7 and the torque sensor 26, whose signals are passed on to a limit value transmitter 33. In the limit value transmitter 33 the measured signals are compared with the data set on the command instrument 18, regarding the nature of the crop. If the measured throughput and/or the measured threshing cylinder torque should exceed the maximum values, then this will be indicated visually on the command instrument 18, and, after a time lag, will first of all set the threshing gap to its maximum width by means of the amplifier 24 and the concave adjusting device 25. If an overload signal should still be present, the driving clutch 31 will be operated by means of a disengaging device 34 and subsequently, with the aid of a further disengaging device 35, a clutch 36, which is connected between the drive motor 29 and the intake and conveyor organs of the combine, will be disengaged so that the crop supply to the threshing cylinder will cease. The procedure described leads to a mechanical locking of the concave and the two clutches in their terminal positions and they can be unlocked by the combine driver after the trouble has been rectified.

The invention may be embodied in other specific forms without departing from the spirit or essential characteristics thereof. The present embodiments are therefore to be considered in all respects as illustrative and not restrictive.

What is claimed is:

1. An arrangement for the automatic control of the threshing process on a combine harvester, said harvester comprising cutting means, threshing means comprising a threshing cylinder and a concave, a drive for the threshing cylinder, conveying means for conveying crop along a path between the cutting means and the threshing means and comprising an intake and conveyor auger and a sloping elevator with a scraper chain, said automatic control arrangement comprising a first control circuit for automatically regulating the speed of the threshing cylinder depending on the crop throughput, measured in the area of the cutting or conveying means, in such a manner that with an increase in the crop throughput a rise in the threshing-cylinder speed will occur and with a decrease in the crop throughput a reduction in the threshing-cylinder speed will occur, and a second control circuit for regulating the combine ground speed depending on the crop throughput in such a manner that the combine ground speed is altered inversely to the change in the crop throughput, said first control circuit comprising a reduction delayer which is so constructed that an output value from a throughput measuring sensor located along said path and connected in the first control circuit or a value derived from said output value which is released by a decrease in the crop throughput is only allowed to pass this reduction delayer after the expiration of a period of time which is substantially the same as that required for the conveyance of the crop from the moment when it is detected by the throughput measuring sensor to the time when that quantity of the crop which is determined by the last existing speed of the threshing cylinder has been threshed out in the threshing means, whereas an output value or a value derived therefrom which is released by an increase in the crop throughput can pass this reduction delayer unhindered.

2. An arrangement in accordance with claim 1, wherein said combine harvester comprises hydraulic control means and said reduction delayer comprises a check valve and a throttle connected in parallel.

3. An arrangement in accordance with claim 1, wherein said combine harvester comprises pneumatic control means and said reduction delayer comprises a check value and a throttle connected in parallel.

4. An arrangement in accordance with claim 1, wherein said combine harvester comprises electrical control means and said reduction delayer comprises an electric switch which makes or breaks the signal flow from the input to the output of the reduction delayer, a time element which operates the electric switch, and a differentiating element which differentiates the input signal of the reduction delayer so as to thereby bring in the time element.

5. An arrangement in accordance with claim 1, wherein said combine harvester comprises electrical control means and said reduction delayer comprises an electric switch which makes or breaks the signal flow from the input to the output of the reduction delayer, and a time element which is brought in by the combination of the digital measurement signals of the controlling variable and the command variable and operates the electric switch of the reduction delayer.

6. An arrangement in accordance with claim 1, wherein said control arrangement comprises a three-point regulator, the reduction delayer consists of an electric switch which makes or breaks the signal flow from the input to the output of the reduction delayer, and a time element which is brought in if there is a decrease in the crop throughput and operates the electric switch of the reduction delayer.

7. An arrangement in accordance with claim 1, wherein the throughput measuring sensor is fitted on the sloping elevator so as to respond to the reaction of the same to the crop throughput.

8. An arrangement in accordance with claim 1, wherein the throughput measuring sensor is fitted on the intake and conveyor auger.

9. An arrangement in accordance with claim 1, wherein the first control circuit for regulating the speed of the threshing cylinder comprises a first comparator in which two measured values are compared which, on the one hand, come from a threshing-cylinder-speed measuring sensor and, on the other hand, from the crop throughput measuring sensor, both measured values, if necessary, being passed through a separate amplifier and/or a measured-value transformer, and wherein the output value of the first comparator is passed to the input of the reduction delayer, whose output value, possibly passed through an amplifier, acts on a regulating unit which is connected between the threshing-cylinder drive and the threshing cylinder to alter the transmission ratio between the threshing-cylinder drive and the threshing cylinder.

10. An arrangement in accordance with claim 9, wherein the regulating unit is constructed as a V-belt variator which comprises axially adjustable variator discs, said axially adjustable variator discs being adjustable simultaneously and counter to one another and mechanically or hydraulically.

11. An arrangement in accordance with claim 9, wherein the reduction delayer introduced into the first control circuit for regulating the speed of the threshing cylinder is designed so that the output value of the first comparator, when it has been released by an increase in the crop throughput, is only allowed to pass through this reduction delayer after the expiry of a period of time which has been reduced by the time required for the threshing-cylinder speed to be increased which, together with the time necessary for the rise in the threshing-cylinder speed, is practically the same as that required for the conveyance of the crop from the moment when it is detected by the throughput measuring sensor to the time when the crop reaches the threshing means.

12. An arrangement in accordance with claim 9, wherein in the first control circuit for automatically regulating the threshing-cylinder speed a further element with a non-linear characteristic curve or an amplifier with a non-linear characteristic curve is connected between the comparator and the regulating unit, through which the regulation of the threshing-cylinder speed is effected progressively, depending upon the alteration in the crop throughput.

13. An arrangement in accordance with claim 9, wherein between the amplifier of the speed-measuring equipment and the first comparator, or between the amplifier of the throughput-measuring equipment an addition element having two inputs is inserted, to whose second input the output value of the summation element is connected.

14. An arrangement in accordance with claim 9, wherein the output value of the threshing-cylinder-speed measuring sensor is connected to one input of the command instrument and said command instrument is so constructed that, after a time-lag, it emits suitable acoustic and/or visual signals as soon as the capacity of the combine is not fully utilized.

15. An arrangement in accordance with claim 14, wherein to one input of the command instrument is connected the output signal of the torque-sensor of the throughput sensor, or of a measurement signal corresponding with this which is dependent upon the crop throughput in order to provide a check on the utilization of the capacity of the combine.

16. An arrangement in accordance with claim 14, wherein a switch is fitted between the command instrument and the acoustic and/or visual signalling equipment in such a manner that, with the combine table raised, the signalling equipment is switched off.

17. An arrangement in accordance with claim 16, wherein with the object of providing overload protection to the combine, a limit-value transmitter is provided with three inputs and four outputs, to the first input of which is connected the output value of the command instrument, and to the other inputs of which are connected the output values of the throughput measuring sensor and the torque sensor, and wherein the output values of the limit-value transmitter are connected to one input of the command instrument as well as to the second input of the amplifier for the concave adjusting device and also to the input of a clutch-disengaging-device as well as to the input of a second clutch disengaging device which acts on an auxiliary clutch connected between the drive motor and the conveying means of the combine.

18. An arrangement in accordance with claim 17, wherein mechanical locking devices are fitted to the concave and a combine-driving clutch and the auxiliary clutch, which lock the concave on reaching the maximum threshing-gap width and the clutches when they are disengaged by a limit-value transmitter and which can be released by hand after the trouble has been rectified.

19. An arrangement in accordance with claim 12, wherein in the first control circuit for automatically regulating the threshing-cylinder speed, means are provided which control the auxiliary power flow to the regulating unit, through which the regulation of the threshing-cylinder speed is effected progressively, depending upon the alteration in the crop throughput.

20. An arrangement in accordance with claim 12, wherein in the control circuit for automatically regulating the threshing-cylinder speed, means are provided for controlling the time constant of a delaying element connected between the comparator and the regulating unit in such a manner that by these means the regulation of the threshing-cylinder speed is effected progressively, depending upon the alteration in the crop throughput.

21. An arrangement in accordance with claim 12, wherein in the control circuit for automatically regulating the threshing-cylinder speed, means are provided for controlling the characteristic curve of the amplifier or of a further element connected between the comparator and the regulation unit in such a manner that the regulation of the threshing-cylinder speed is effected progressively, depending upon the alteration in the crop throughput.

22. An arrangement in accordance with claim 1, wherein in a command instrument is provided which, on the basis of adjustments which can be made manually, supplies output values which correspond to the type of crop.

23. An arrangement in accordance with claim 22, wherein at a suitable place on the conveyor means a sensor is fitted to measure the moisture content of the crop and whose output value, possibly through an amplifier and/or a measuring transformer, is connected to one input of a summation element to the second input of which is connected the output value of a command instrument operable by the driver of the combine, and wherein the output value of said summation element is connected to a second input of the reduction delayer.

24. An arrangement in accordance with claim 23, wherein the output value of the summation element is connected to a further input of an amplifier having a non-linear characteristic curve, or to a further element connected between a first comparator and the regulating unit.

25. An arrangement in accordance with claim 23, wherein the output value of the summation element acts on the circuit of an auxiliary power flow which operates the regulating unit.

26. An arrangement in accordance with claim 23, wherein the output value of the summation element is connected to the second input of the reduction delayer connected between a first comparator and the regulating unit.

27. An arrangement in accordance with claim 1, wherein the concave is provided with a distance feeler for measuring the threshing gap, whose output value, possibly through an amplifier and/or a measurement transformer, is connected to one input of a second comparator, to whose second input is connected the output value of a summation element, and wherein the output value of the second comparator, possibly through an amplifier, is connected to a concave adjusting device which serves to adjust the threshing gap.

28. An arrangement in accordance with claim 1, wherein the threshing cylinder has a shaft provided with a measuring sensor for the torque acting upon the threshing cylinder, the output value of which, possibly through an amplifier and/or a measurement transformer is connected to one input of a third comparator, to whose second input either the output value of a command instrument or the output value of a summation element is connected, and wherein the output value of the third comparator acts on a regulating unit which, possibly with the interposition of an amplifier, is connected between the drive motor and the driving clutch of a gearbox on the combine.

29. An arrangement in accordance with claim 28, wherein a changeover-switch is fitted in such a manner between the third comparator and the regulating unit of a second control circuit for regulating the combine ground speed in accordance with the crop throughput that, with the combine table raised, the second control circuit is disconnected and a manually-controlled ground-speed regulating equipment comes into operation.

30. Automatic control means for a combine harvester including means for driving said harvester across the surface of the ground, means for cutting the crop, threshing means, and means for conveying said crop along a path from said cutting means to said threshing means, said control means comprising a control circuit for automatically regulating the speed of the threshing means depending on the crop throughput fed to said threshing means such that an increase in the crop throughput causes an increase in the speed of said threshing means and a decrease in the crop throughput causes a decrease in the speed of said threshing means, said control circuit comprising a reduction delayer adapted to receive an output value from a measuring sensor located at a point along said path connected to said control circuit and when said output value represents a decrease in crop throughput, to delay transmission of said output value until the expiration of a period of time equivalent to that time required for the crop to be conveyed from the point of detection by said sensor to the threshing means and to pass through said threshing means and when said output value represents an increase in crop throughput, to permit transmission of said output value without delay.

31. Automatic control means in accordance with claim 30 further comprising a second control circuit for regulating the speed of said driving means and consequently the ground speed of said harvester depending upon the crop throughput such that the harvester ground speed varies inversely to the crop throughput rate.

References Cited

UNITED STATES PATENTS

| | | | |
|---|---|---|---|
| 2,639,569 | 5/1953 | Pasturczak | 56—10.2 |
| 3,093,946 | 6/1963 | Pitt et al. | 56—10.2 |
| 3,138,908 | 6/1964 | Budzich | 56—Dig. 15 |
| 3,156,245 | 11/1964 | Hobbs | 56—10.2 |
| 3,073,099 | 1/1963 | Anderson | 56—Dig. 15 |

FOREIGN PATENTS 234,307  6/1961  Australia.

ANTONIO F. GUIDA, Primary Examiner

U.S. Cl. X.R.

56—Dig. 15; 130—27J